A. P. & W. P. St. JOHN.
Coffee-Pots.

No. 150,263.

Patented April 28, 1874.

WITNESSES.

INVENTOR:

BY

ATTORNEYS.

UNITED STATES PATENT OFFICE.

ALEXANDER P. ST. JOHN AND WILLIAM P. ST. JOHN, OF MOBILE, ALABAMA.

IMPROVEMENT IN COFFEE-POTS.

Specification forming part of Letters Patent No. 150,263, dated April 28, 1874; application filed March 21, 1874.

*To all whom it may concern:*

Be it known that we, ALEXANDER P. ST. JOHN, of Mobile, in the county of Mobile and State of Alabama, and WILLIAM POPE ST. JOHN, of same county, State, and city, have invented a new and Improved Coffee-Pot, of which the following is a specification:

Our invention consists of a coffee pot or urn with an upper and a lower compartment, so contrived that when steam is generated in the lower compartment the water will be forced up through the coffee into the upper compartment, and when the boiling ceases, and the steam condenses in the lower chamber, the vacuum formed will cause the hot water to pass through the coffee again into the lower chamber, from which it will be poured for use; or, if need be, the operation can be repeated by setting the pot on to boil again to increase the strength of the decoction.

Figure 1:
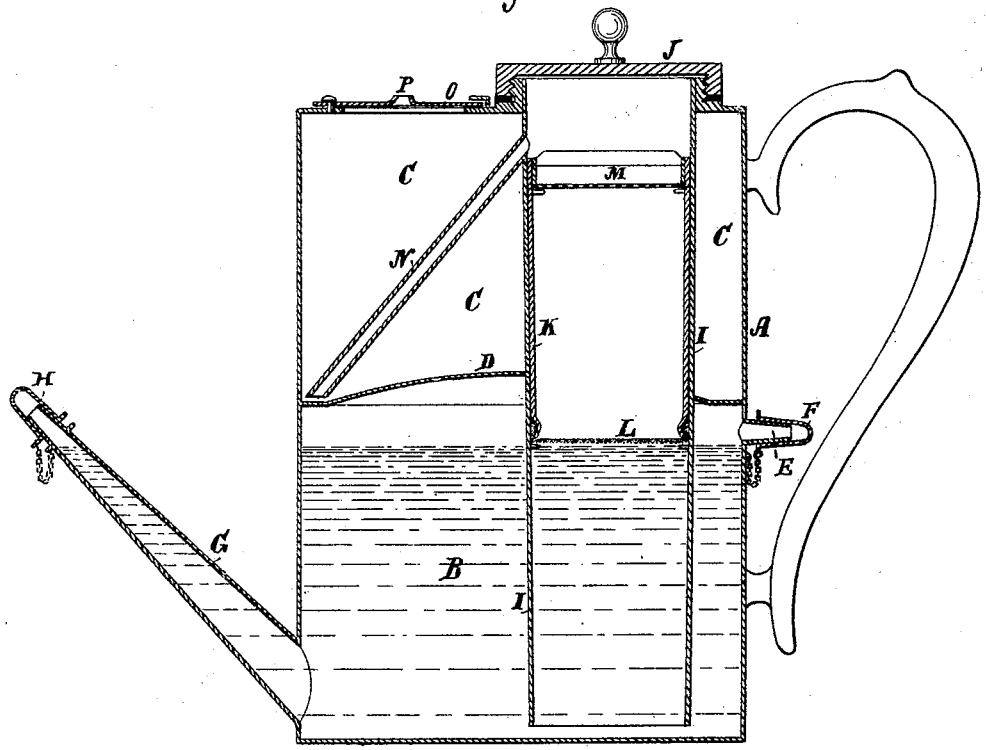
Figure 2:
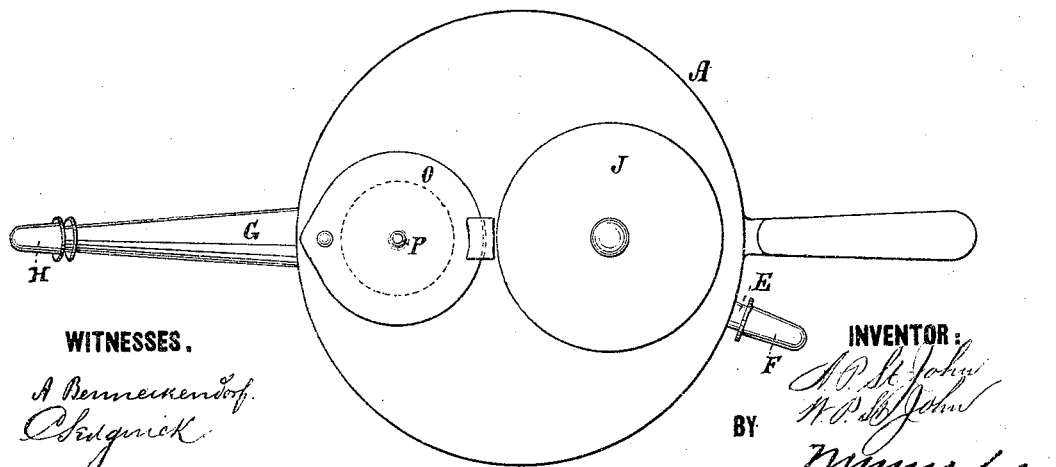

Figure 1 is a sectional elevation of our improved coffee-pot, and Fig. 2 is a top view.

Similar letters of reference indicate corresponding parts.

A is the shell of the pot. B is the lower compartment; C, the upper one; D, a horizontal partition separating said compartments. E is a vent to lower compartment, with steam-tight cap F. G is a spout for pouring the coffee from B. H is a cap for closing the spout steam-tight. Plugs may be used instead of the caps. I is a large tube extending from the top, through both compartments, to within an eighth of an inch, or thereabout, of the bottom, being open at the top, and closed steam-tight by a screw-cap, J. K is the coffee-holder. It consists of a cylinder with a reticulated bottom, L. It fits into tube I from the top, so as to be readily put in and taken out, and has a removable cover, M, of reticulated substance. N is a small tube extending from tube I above the coffee-holder nearly to the bottom of compartment C. O is a removable cover to compartment C, to afford access for cleaning it; and P is a vent for compartment C.

The coffee being put in the holder K, and compartment B filled with water to vent E, or nearly to it, the pot is ready for putting on the fire to boil. The steam generated in B will force the hot water up through the coffee in holder K into compartment C, except the small quantity below the lower end of tube I, after which steam will pass up and blow through vent P, to give notice that the pot should be removed to stop the boiling; then the steam will condense in chamber B, and form a vacuum, which will draw the water back through tube C and the coffee-holder into B again, from which it may be poured for use on removing the caps H and F, the latter being to vent compartment B, so that the water will flow out.

If desired, the water may be again forced up through the coffee and back, as before, by setting the pot on to boil again for more thoroughly extracting the essence.

The cover M is employed mainly to prevent the solid matters from passing over into chamber C.

The arrangement is very simple, and at the same time efficient, and adapted to make excellent coffee without waste.

Having thus described our invention, we claim as new and desire to secure by Letters Patent—

1. The combination of tube I, coffee-holder K, and tube N with coffee-pot divided into upper and lower compartments C B by a partition, D, the lower compartment B and the tube I being provided with means for closing it steam-tight, substantially as specified.

2. The combination of a reticulated cover, M, with the coffee-holder K and compartment C, substantially as specified.

ALEXR. POPE ST. JOHN.
WM. POPE ST. JOHN.

Witnesses:
A. F. TALIAFERRO,
JNO. C. RUSE.